United States Patent Office

3,126,366
Patented Mar. 24, 1964

3,126,366
REACTION OF PERFLUOROPROPYLENE AND DISULFUR DECAFLUORIDE
James W. Dale, Winchester, Mass., assignor to Monsanto Research Corporation, St. Louis, Mo., a corporation of Delaware
No Drawing. Filed Apr. 24, 1962, Ser. No. 190,850
4 Claims. (Cl. 260—125)

This invention relates to thermally stable materials, and more particularly, provides a novel thermally stable, fluorine-containing high-boiling liquid and a novel method of making the same.

Thermally stable, high-boiling liquids are widely employed in industry and technology as the circulating fluid medium in heat exchangers and the like. Presently available materials have various deficiencies. For example, their vapor pressure may be sufficient to produce substantial losses if they are employed in an open circulating system. If they come into contact with other organic substances, they may dissolve these or be dissolved in them, thus weakening the structure.

It is an object of this invention to provide novel thermally stable high-boiling materials.

A particular object of this invention is to provide novel thermally stable high-boiling materials having a low vapor pressure.

Another object is to provide a novel method of providing thermally stable high-boiling liquid compounds of carbon, fluorine and sulfur.

These and other objects will become evident on a consideration of the following specification and claims.

It has now been found that by heating perfluoropropylene with disulfur decafluoride under pressure, reaction is effected to form a liquid reaction product which is a compound of carbon, fluorine and sulfur and which has unusual thermal stability, volatility and solvency properties.

Generally, methods employed hitherto to provide compounds of carbon, sulfur and fluorine have involved either the reaction of a sulfur-containing carbon compound with a source of fluorine, or else the reaction of a fluorinated carbon compound with sulfur. The method of the present invention is distinguished from such methods by the fact that both the carbon compound and the sulfur compound herein employed are fluorine-containing. Sulfur fluorides have been used hitherto as fluorinating agents. In the method of the present invention, however, the sulfur fluoride herein employed acts as a co-reactant, directly entering into the composition of the ultimate product. The product contains fluorinated sulfur atoms as an integral part of its structure. The specific nature of the resulting product has not been definitively established, the inertness and stability of the materials making it difficult to arrive at analytical results by established techniques. Thus for example, in a high temperature vapor phase chromatography column in which temperatures could be raised up to 350° C., the liquid was non-elutable in the helium stream. Accordingly, the product is thus best characterized as the result of the method of the invention, as further described hereinafter.

In conducting the method of the invention, perfluoropropylene, of the formula $CF_3CF:CF_2$, is heated under pressure with disulfur decafluoride, of the formula $S_2F_{10}$. A useful ratio of the fluorinated olefin to the sulfur fluoride is about a 4:1 ratio. The ratio may, however, vary. For example, the molar ratio may vary in the reaction mixture from about 10:1 down to about 1:2. Heating is desirable to achieve a reasonable rate of reaction, but the particular temperature selected for the reaction is not critical. For example, it may range from a temperature only a few degrees above room temperature up to any temperature below the decomposition temperature of the reaction mixture components, and the particular temperature selected to achieve a specific reaction rate will generally vary depending on the pressure. Specifically, temperatures between about 100° and 200°, and more particularly, between about 140° and 160° C. are found useful. The pressures employed in the reaction are also susceptible of variation over a relatively wide range. Both of the reactants employed in conducting the present method are volatile at room temperature and are best handled by condensing them into the reaction vessel at sub-ambient temperatures, after which the reaction vessel may be sealed and its contents brought to ambient or more elevated temperatures. Employing such a procedure, the autogenous pressures produced in a pressure reaction vessel upon heating to suitable reaction temperatures are generally adapted for conducting the reaction. Such autogenous pressures may for example reach up to about 1000 pounds per square inch (p.s.i.). The time of reaction will generally depend only on pressure, temperature, and the extent of reaction desired. Excess perfluoropropylene is recovered substantially unchanged to the extent that it fails to react. In a small scale batch system for example, a reaction time of about 24 hours has been found suitable to produce substantial yields.

Solvents and diluents are generally unnecessary and indeed undesirable in conducting the reaction of this invention, but may sometimes be present. Suitable solvents which will be inert towards the reaction and under the reaction conditions include for example saturated perfluorocarbons boiling below about 200° C., such as perfluoroheptane.

On completion of the reaction, the product may be separated from unreacted starting material most conveniently by simply evaporation off such unreacted material. The liquid residue which is the product is so high-boiling and thermally stable that this is the simplest and most effective method of isolating it. However, other usual means such as extraction and the like may be employed to purify this product if desired.

The product of this invention, prepared by the stated method, is a colorless liquid at elevated temperatures. Cooling to room temperature may produce thickening and solidification to a gummy, tacky semi-solid, which reliquifies on heating.

The invention is illustrated but not limited by the following examples.

*Example 1*

This example illustrates conducting the method of this invention to provide the present novel liquid product, employing a ratio of perfluoropropylene to disulfur decafluoride of about 4 to 1.

About 15 grams (99 millimoles) of perfluoropropylene and 6.8 grams of disulfur decafluoride (26.8 millimoles) are measured by volume and then condensed at −188° C. into a stainless steel bomb-type reactor (75 milliliter capacity). The reactants are allowed to rise to room temperature within the bomb, which is then immersed in an oil bath and held at a temperature of 140–160° C. for 23 hours. After the reactor has been cooled to room temperature, volatiles are removed from the contents of the reactor using a high vacuum transfer technique. Vapor pressure chromatography identifies these volatile materials as comprising unreacted perfluoropropylene. The residue remaining in the bomb is a viscous, slightly cloudy, colorless liquid.

An attempted boiling point determination made on this liquid using a micro technique fails to produce boiling at up to 300° C. On recooling to room temperature, the product becomes a gummy or tacky semi-solid: the heating removes residual volatiles from the reaction product.

The low volatility of the liquid in the 300° C. range is also observed in an attempted vapor phase chromatography analysis: it failed to elute from a column adapted for analysis of perfluorinated sulfur and carbon materials at temperatures up to 350° C.

Infrared analysis of the product shows CF absorption bands at 8.2 and 8.7µ and a S–F absorption band at 11.25µ, all of which bands are retained after heating to 300° C. Furthermore, it is found to be insoluble in either water or carbon tetrachloride, whereas a fluorocarbon high-boiling oil is soluble in carbon tetrachloride. Elemental analysis shows the composition of the product to be 19.0% C and 73.6% F. The remaining weight is sulfur. Accordingly the product is a sulfur-containing material, differing in composition as well as in properties from hitherto known perfluorocarbons.

*Example 2*

This example illustrates the reaction of the fluorinated olefin with the sulfur fluoride at a different ratio.

Disulfur decafluoride in the amount of 9.05 millimoles and perfluoropropylene in an amount corresponding to 10.66 millimoles are condensed together in a bomb type reactor, providing a molar ratio of perflouoropropylene to the sulfur fluoride of slightly more than 1:1. The reactor contents are raised to ambient temperatures and then further heated to about 150–160° C. for about 24 hours. The reactor is then cooled again to room temperature, at which a small amount of liquid is present. The contents of the reactor are frozen solid by cooling in a liquid nitrogen bath (−196° C.) and volatiles are drawn off under vacuum. A small amount of a high-boiling water-white liquid remains in the reactor. This water-white liquid is the high-boiling thermally stable product of the invention.

While the invention has been illustrated with reference to various particular preferred embodiments thereof, it will be appreciated that modification and variation can be made within the scope of the invention which is limited only as defined in the appended claims.

What is claimed is:

1. The method of providing a thermally stable, high-boiling compound of carbon, sulfur and fluorine which comprises heating perfluoropropylene with disulfur decafluoride under pressure.
2. The method of claim 1 in which the ratio of perfluoropropylene to disulfur decafluoride is between about 1:2 to 10:1.
3. The method of claim 1 in which the temperature of the reaction is between about 100° and about 200° C.
4. The product of the process of claim 1.

No references cited.